US009752480B2

(12) United States Patent
Bergh et al.

(10) Patent No.: US 9,752,480 B2
(45) Date of Patent: Sep. 5, 2017

(54) METHOD OF OPERATING A DIESEL ENGINE AND DIESEL ENGINE ARRANGEMENT HAVING PLURAL OPERATING MODES

(71) Applicant: Mack Trucks, Inc., Greensboro, NC (US)

(72) Inventors: Patrik Bergh, Järved (SE); Heath Morris, Baltimore, MD (US); Johan Dahl, Göteborg (SE)

(73) Assignee: Mack Trucks, Inc., Greensboro, NC (US)

( * ) Notice: Subject to any disclaimer, the term of this patent is extended or adjusted under 35 U.S.C. 154(b) by 0 days.

(21) Appl. No.: 14/650,853

(22) PCT Filed: Dec. 23, 2012

(86) PCT No.: PCT/US2012/071547
§ 371 (c)(1),
(2) Date: Jun. 9, 2015

(87) PCT Pub. No.: WO2014/098916
PCT Pub. Date: Jun. 26, 2014

(65) Prior Publication Data
US 2015/0315945 A1 Nov. 5, 2015

(51) Int. Cl.
*F01N 3/20* (2006.01)
*F02D 41/30* (2006.01)
(Continued)

(52) U.S. Cl.
CPC .............. *F01N 3/20* (2013.01); *F01N 3/0253* (2013.01); *F01N 3/0842* (2013.01); *F01N 3/208* (2013.01);
(Continued)

(58) Field of Classification Search
CPC .......... F02D 41/30; F01N 3/2066; F01N 3/20; F02M 25/07
(Continued)

(56) References Cited

U.S. PATENT DOCUMENTS 4,496,286 A 1/1985 Gagnon
5,272,871 A 12/1993 Oshima et al.
(Continued)

FOREIGN PATENT DOCUMENTS

AT 510912 A2 7/2012
CN 102022214 A 4/2011
(Continued)

OTHER PUBLICATIONS

JP 2006-170057, Machine Translation, Translated on Apr. 20, 2017.*
(Continued)

*Primary Examiner* — Patrick Maines
(74) *Attorney, Agent, or Firm* — WRB-IP LLP (57) ABSTRACT

A method is provided of operating a diesel engine having an exhaust aftertreatment system (EATS) including one or more apparatus for controlling exhaust NOX levels, the engine including a plurality of systems and components, at least some of which systems and components are adapted to be set to one or more control setpoints for one or more base actuators of the engine. The method includes establishing a plurality of engine operating modes, each operating mode differing from any other operating mode with respect to at least one control setpoint, for each operating mode, mapping fuel economy versus NOX levels exiting the EATS, selecting an operating mode from among the plurality of operating modes so that exhaust exiting the EATS contains NOX at no more than a predetermined NOX level and a least amount of fuel is consumed per unit energy; and operating the engine
(Continued)

in the selected operating mode. An engine arrangement is also provided.

23 Claims, 3 Drawing Sheets

(51) Int. Cl.
    *F01N 3/08*     (2006.01)
    *F01N 9/00*     (2006.01)
    *F01N 3/025*     (2006.01)
    *F02M 26/00*     (2016.01)

(52) U.S. Cl.
CPC .............. *F01N 3/2066* (2013.01); *F01N 9/00* (2013.01); *F02D 41/30* (2013.01); *F02M 26/00* (2016.02); *F01N 2560/026* (2013.01); *F01N 2610/02* (2013.01); *F01N 2900/0412* (2013.01); *F01N 2900/08* (2013.01); *Y02T 10/24* (2013.01); *Y02T 10/47* (2013.01)

(58) Field of Classification Search
USPC ............................................................ 60/295
See application file for complete search history.

(56) References Cited

U.S. PATENT DOCUMENTS

| | | | |
|---|---|---|---|
| 6,304,812 B1* | 10/2001 | Kolmanovsky | F01N 3/0842 60/274 |
| 7,906,862 B2 | 3/2011 | Donnelly et al. | |
| 8,156,729 B2 | 4/2012 | Sun | |
| 2002/0165063 A1* | 11/2002 | Ito | B60W 10/06 477/37 |
| 2003/0089101 A1 | 5/2003 | Tanaka et al. | |
| 2007/0157604 A1* | 7/2007 | Kakuya | F02D 13/0246 60/285 |
| 2007/0163244 A1* | 7/2007 | Federle | F01N 3/208 60/286 |
| 2007/0234710 A1* | 10/2007 | Franz | F02D 41/028 60/295 |
| 2008/0010974 A1* | 1/2008 | Frazier | F01N 11/002 60/277 |
| 2010/0107611 A1* | 5/2010 | Cleary | F01N 3/0814 60/288 |
| 2011/0162350 A1 | 7/2011 | Ponnathpur | |
| 2013/0067890 A1* | 3/2013 | Michalek | F01N 3/208 60/274 |
| 2013/0111878 A1* | 5/2013 | Pachner | F01N 3/208 60/274 |
| 2013/0152549 A1* | 6/2013 | Light-Holets | F01N 9/00 60/274 |
| 2014/0260190 A1* | 9/2014 | DeGeorge | F01N 3/208 60/274 |

FOREIGN PATENT DOCUMENTS

| | | | |
|---|---|---|---|
| JP | 2002293172 A | | 10/2002 |
| JP | 2006170057 A | * | 6/2006 |

OTHER PUBLICATIONS

Extended European search report dated Jul. 6, 2016 of corresponding European application No. 12890484.4.
International Search Report (dated May 7, 2013) for corresponding International App. PCT/US2012/071547.
International Preliminary Report on Patentability (dated Jan. 9, 2015) for corresponding International App. PCT/US2012/071547.
1st Office Action dated Feb. 23, 2017 for corresponding China application No. 201280077941.4 translated.
1st Office Action dated Sep. 8, 2016 for corresponding Japan application No. 2015-549344 translated.

* cited by examiner

METHOD OF OPERATING A DIESEL ENGINE AND DIESEL ENGINE ARRANGEMENT HAVING PLURAL OPERATING MODES

BACKGROUND AND SUMMARY

The present invention relates generally to methods of operating diesel engines and to diesel engine arrangements and, more particularly, to such methods and diesel engine arrangements that involve plural operating modes.

Diesel engines are often operated in a plurality of discrete operating modes that differ from one another with respect to one or more different setpoints of base engine actuators. For example, in one mode of operation, an engine arrangement including an EGR line might have a setpoint in which an EGR valve is open while, in another mode of operation, the EGR valve may be closed.

Some engines are controlled to have a variety of different base actuators set in particular way for different operating modes. For example, one setting of base actuators may produce a "fuel economy mode" in which the object is to conserve fuel, regardless of, for example, NOX levels output from the engine arrangement. Another setting of base actuators may produce a "low heat mode" in which the object is to produce engine temperatures or exhaust at a particular temperature. Yet another setting of base actuators may produce a "high heat mode" in which the object is to produce higher engine or exhaust temperatures than are produced at low heat mode, such as for purposes of active regeneration of a diesel particulate filter (DPF).

Air quality regulations in many countries presently limit various emissions such as oxides of Nitrogen (NOX) from, e.g., vehicles. Various exhaust aftertreatment systems and components have been developed to comply with these requirements. In efforts to comply with these requirements, the focus is typically on whether, under given operating conditions, the emissions limits are met. The inventors have recognized that there has been substantially no consideration of the relative fuel economy of operation with one set of base actuator control setpoints that complies with emissions requirements versus operation with another set of base actuator control setpoints that also complies with the emissions requirements. They have recognized that there may be circumstances where it may be desirable to switch to another operating mode from a current operating mode, even though operation in the current mode complies with the emissions requirements, in order to achieve better fuel economy.

According to an aspect of the present invention, a method is provided of operating a diesel engine having an exhaust aftertreatment system (EATS) including one or more apparatus for controlling exhaust NOX levels, the engine comprising a plurality of systems and components, at least some of which systems and components being adapted to be set to one or more control setpoints for one or more base actuators of the engine. The method comprises establishing a plurality of engine operating modes, each operating mode differing from any other operating mode with respect to at least one control setpoint, for each operating mode, mapping fuel economy versus NOX levels exiting the EATS, selecting an operating mode from among the plurality of operating modes so that exhaust exiting the EATS contains NOX at no more than a predetermined NOX level and a least amount of fuel is consumed per unit energy; and operating the engine in the selected operating mode.

According to another aspect of the present invention, a method is provided of operating a diesel engine having an exhaust aftertreatment system (EATS) including one or more apparatus for controlling exhaust NOX levels. The method comprises operating the engine in a first mode with a first series of control setpoints for a plurality of base actuators of the engine, operating the engine in a second mode with a second series of control setpoints for the plurality of base actuators, at least one control setpoint of the first and second series of control setpoints being different, tracking exhaust mass or volume flow through the EATS, NOX levels exiting the EATS, and temperature in the EATS for the engine over a plurality of engine speeds and loads in the first mode and in the second mode, and selecting one of the first mode and the second mode so that, for a given engine speed and load, exhaust exiting the EATS contains NOX at no more than a predetermined NOX level and a least amount of fuel is consumed per unit energy.

According to another aspect of the present invention, a diesel engine arrangement comprises a diesel engine having an exhaust aftertreatment system (EATS), a NOX sensor arranged to sense NOX levels exiting the EATS, and a controller arranged to receive a signal from the NOX sensor, the controller comprising a map of fuel economy versus NOX levels exiting the EATS for a plurality of engine operating modes, each engine operating mode differing from any other engine operating mode with respect to at least one base actuator of the engine, the controller being programmed to select one of the plurality of operating modes and cause the engine to operate in the selected operating mode so that, for a given engine speed and load, exhaust exiting the EATS contains NOX at no more than a predetermined NOX level and a least amount of fuel is consumed per unit energy.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
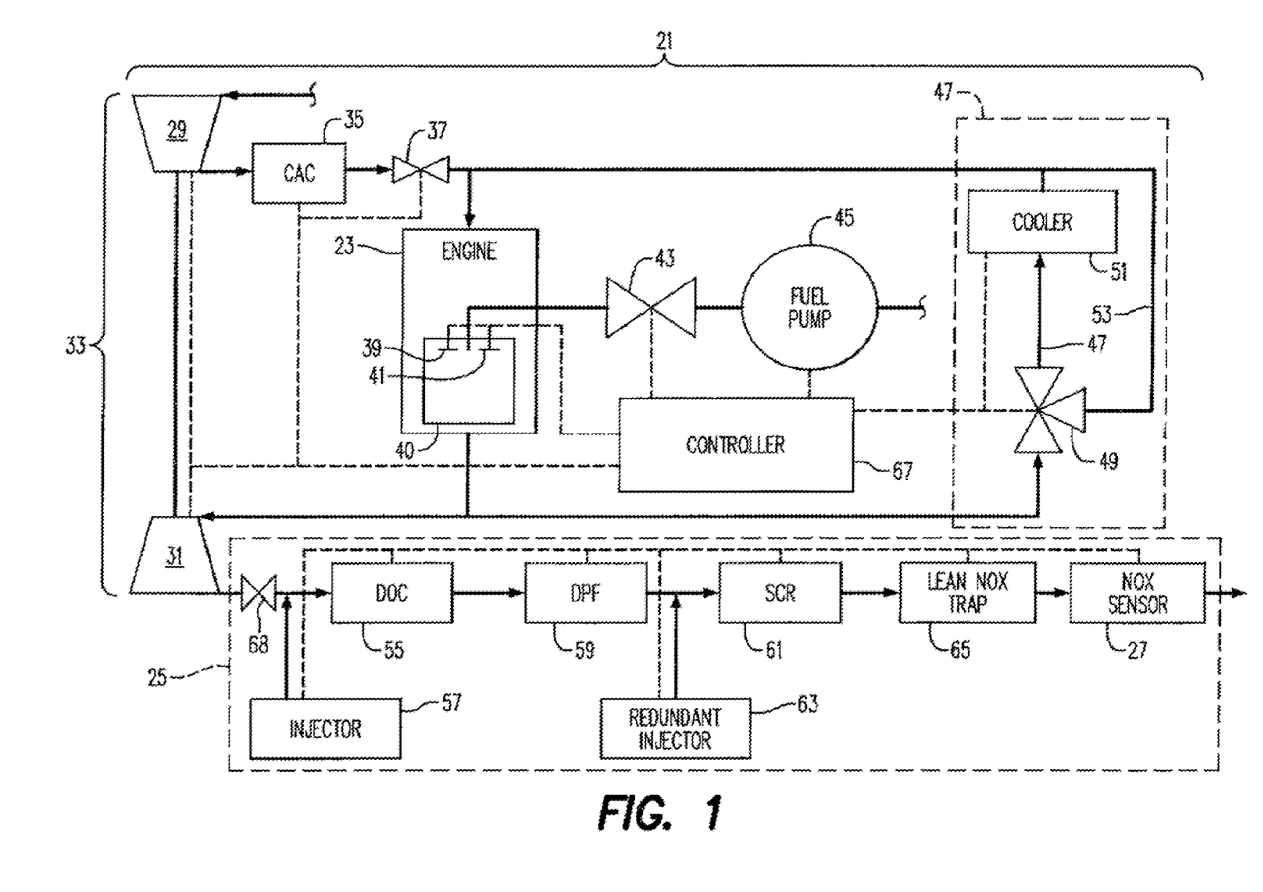
FIG. 1 is a schematic view of an engine arrangement according to an aspect of the present invention.

FIG. 1 shows a diesel engine arrangement 21 according to an aspect of the present invention. The diesel engine arrangement 21 comprises a diesel engine 23 having an exhaust aftertreatment system (EATS) 25. A NOX sensor 27 arranged to sense NOX levels exiting the EATS 25. The diesel engine arrangement 21 is particularly useful in connection with use in a vehicle such as a truck, however, it can be used in a variety of other applications, as well.

The diesel engine arrangement 21 can include a compressor 29 upstream of the engine 23 that compresses, usually, ambient air. The compressor 29 can be associated with a turbine 31 as part of a turbocharger 33. The engine arrangement 21 can further include a charge air cooler (CAC) 35 upstream of the engine and downstream of the compressor, a throttle valve 37 upstream of the engine and downstream of the charge air cooler, engine cylinder inlet valves 39 for cylinders 40, cylinder exhaust valves 41, fuel injection valves 43, fuel pumps 45, and an exhaust gas recirculation line (EGR) 47 comprising an exhaust gas recirculation (EGR) valve 49. The EGR line 47 will ordinarily extend from a point downstream of the engine 23 and upstream of the turbine 31 to a point upstream of the engine. A cooler 51 may be provided in the EGR line 47 between the EGR valve 49 and the point upstream of the engine. A bypass line 53 can also be connected between the EGR valve 49 and the point upstream of the engine 23 in the event that it is not desired to cool the EGR gas in the cooler 51.

The engine 21 can be operated in a plurality of different operating modes by changing one or more control setpoints of what shall be referred to here as base actuators of the engine. Base actuators shall be defined as those components of the engine that affect how the engine operates at different speeds and loads. For example, the setpoint(s) of the compressor 29 (and of an associated turbine 31 of a turbocharger 33) might be varied to alter engine inlet air pressure; the setpoint of the CAC 35 might be varied to alter combustion chamber temperature, such as by bypassing the CAC; the setpoint of the intake air throttle valve 37 might be varied to alter engine inlet air volume and pressure; the setpoints of cylinder inlet valves 39 and/or of cylinder exhaust valves 41 might be varied by advancing or delaying timing of their opening; setpoints of fuel injection valves 43 can be varied by advancing or delaying timing of their opening the setpoint of a fuel pump 45 can be varied by increasing or decreasing pressure; the setpoint of a turbine 33 can be varied by increasing or decreasing turbine backpressure; and the setpoint of an EGR valve 49 can be varied by fully or partially opening or closing the valve. The foregoing should be understood to be merely illustrative of base engine actuators and the manner in which their setpoints might be varied. Many engine concepts will have additional, fewer, or different base actuators, and many base actuators may have setpoints that can be varied in ways other than those listed above. Examples of different types of engine concepts include, by way of illustration and not limitation, engine arrangements with turbo compound arrangements, engine arrangements without EGR, engine arrangements with variable geometry turbines, multiple turbochargers, multiple-stage turbochargers, and twin turbochargers, engine arrangements with variable geometry turbines with EGR, fixed geometry turbines with EGR, two stroke engines, and four stroke engines.

The EATS 25 of the diesel engine arrangement 21 will typically include a plurality of aftertreatment devices such as a diesel oxidation catalyst (DOC) 55, an injector 57 for dosing fuel, typically upstream of the DO, a diesel particulate filter (DPF) 59, a selective catalytic reduction catalyst (SCR) 61, a reductant injector 63 for injecting reductant upstream of the SCR, and a lean NOX trap 65. The foregoing is merely illustrative of typical components of the EATS 25. The EATS 25 need not include all of the illustrated components, and may include additional or different aftertreatment components.

A controller 67 is arranged to receive a signal from a sensor such as the NOX sensor 27, as well as from all or some of the other base actuators and components of the EATS 25, and any other components forming part of the engine arrangement or a larger system of which the engine arrangement is a part, such as a vehicle in which the engine arrangement is disposed. The controller 67 comprises a map of fuel economy versus NOX levels exiting the EATS 25 (which may be measured by the NOX sensor 27) for a plurality of engine operating modes, each engine operating mode differing from any other engine operating mode with respect to at least one base actuator of the engine 23. The controller 67 is programmed to select one of the plurality of operating modes and cause the engine to operate in the selected operating mode so that, for a given engine speed and load, exhaust exiting the EATS 25 contains NOX at no more than a predetermined NOX level and a least amount of fuel is consumed per unit energy.

Figure 2:
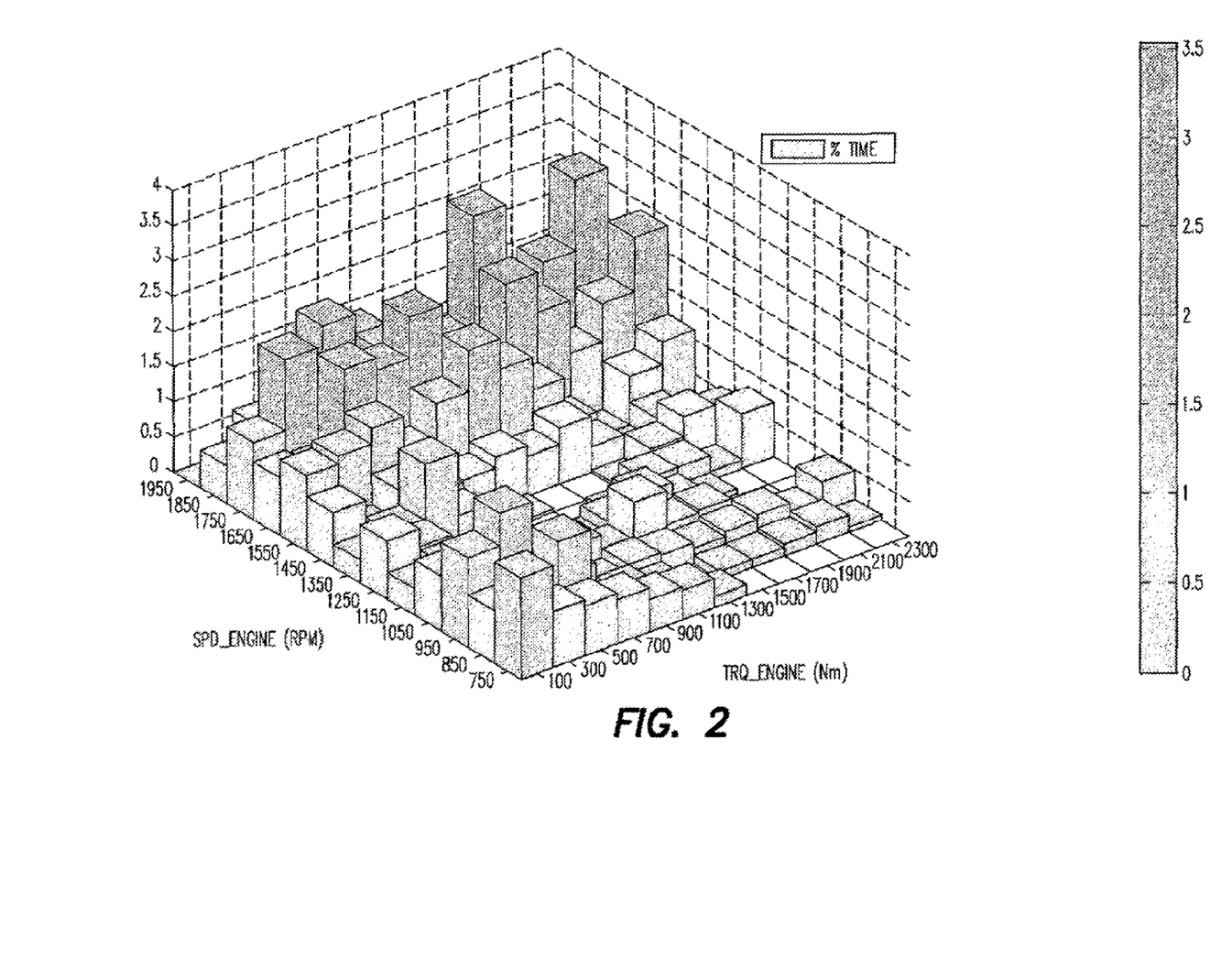
FIG. 2 is a graph illustrating a record of a percentage of time that an illustrative engine has spent at particular engine loads and speeds.

The maps of fuel economy versus NOX levels will be periodically or continuously updated by periodically or continuously recording these levels at various engine speeds and load. The amount of time that the engine spends at different speeds and loads will also ordinarily be tracked and continuously or periodically updated. A graph or map illustrating a record of the percentage of time that an illustrative engine has spent at different speeds (spd_Engine) and loads (Trq_Engine) is shown in FIG. 2. Fuel economy and NOX levels are mapped for the various engine speeds and loads in the various operating modes. The map can be updated periodically or continuously to reflect changes in fuel economy and NOX levels at the various engine speeds and loads, which can account for changes such as aging EATS components.

Moreover, when, for a given engine, the map of the amount of time that the engine spends at different speeds and loads changes in one or more of the available modes, the calculated fuel economy for the mode also changes. Fuel economy and NOX levels are based on the map of time at various engine speeds and loads as in FIG. 2 and, consequently, when the map of time at engine speed and load changes, the map of fuel economy and NOX levels at the various recorded engine speeds and loads will also change.

Typically, the engine arrangement 21 will have at least two operating modes which might be broadly described as a "normal operation mode" and an "engine heat mode." Various different modes may be provided within the normal operation mode, such as a "fuel economy mode" set up to optimize fuel consumption and which may result in high NOX levels, a "low NOX idle mode" in which the engine idles but it set to maintain low NOX levels, a "cold start mode" when the engine is too cold for ordinary normal operation, an "EGR protection mode" used when the EGR valve 49 is closed or partly closed, or an off-highway mode used for robust operation at low vehicle speeds. Engine heat mode will ordinarily include different modes, such as a "low heat mode" in which exhaust temperature in a moving vehicle is increased above temperatures that would result from normal operation and which typically involves some form of fuel penalty, such as might result from warm EGR gas or a bypass of the CAC, a "high heat mode" in which exhaust temperature in a moving vehicle is further increased and which typically involves some further form of fuel penalty, such as might result from operation of a device such as but not limited to a valve 68 for increasing backpressure in the EATS 25, and a "high heat parked mode". Other operating modes might be provided, such as for use with different engine concepts, and not all engine concepts have the same operating modes.

For purposes of the present application, an engine arrangement 21 with three engine operating modes, namely, a fuel economy mode, a low heat mode, and a high heat mode, shall be discussed. It will be appreciated that the invention is applicable to engines arrangements having additional or other operating modes. For fuel economy mode, low heat mode, and high heat mode, the engine 23 is adapted to interpolate between a high NOX mode and a low NOX mode by adjusting one or more engine operating parameters, which is not necessarily true of all engine operating modes. It is assumed for purposes of discussion that interpolation between high NOX and low NOX modes occurs along a straight line, however, this is not necessarily the case. The engine operating parameters may involve the adjustment of one or more base actuator setpoints or other operating parameter affecting engine load, engine speed, fuel economy, and/or engine exhaust gas temperature.

Figure 3:
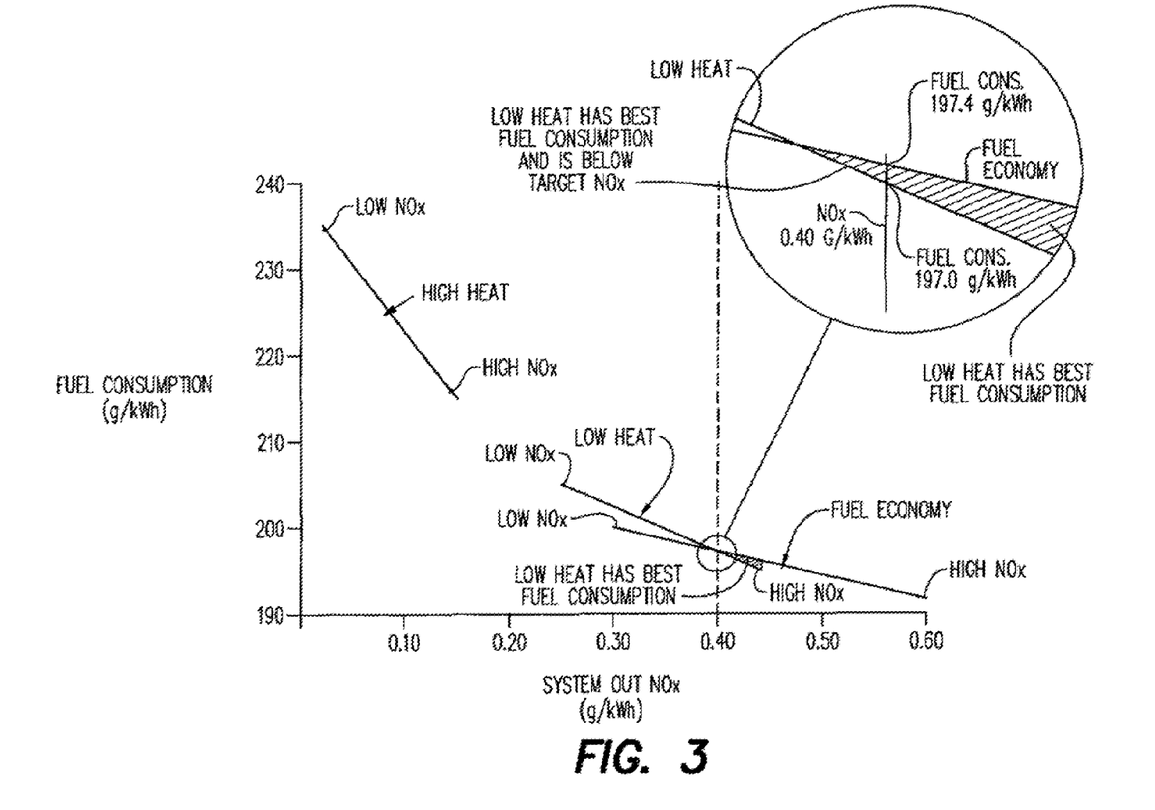
FIG. 3 is a graph showing a relationship between fuel consumption and system out NOX levels for an engine according to an aspect of the present invention.

The controller 67 is programmed so that, for whichever operating mode (fuel economy, low heat, or high heat) the engine 23 is permitted to interpolate toward the high NOX mode in the selected operating mode to no higher than a point at which exhaust NOX levels are at or below the predetermined NOX level. As seen in the graph in FIG. 3, when the engine 23 interpolates toward the high NOX mode while operating in the selected operating mode (fuel economy mode in the illustrated example of FIG. 3), when or before NOX levels are at the predetermined NOX level (0.40 g/kWh in the illustrated example) a different engine operating mode (low heat mode in the illustrated example) is selected from among the plurality of operating modes so that exhaust exiting the EATS contains NOX at no more than the predetermined NOX level and the least amount of fuel is consumed per unit energy. As can be seen from the enlarged portion of the graph of FIG. 3, fuel consumption in fuel economy mode is lower than fuel consumption in low heat mode up until a point at which system out NOX is close to a target value of 0.40 g/kWh, after which fuel consumption in low heat mode is lower than fuel consumption in fuel economy mode. The region of operation in which fuel consumption in low heat mode is lower than fuel consumption in fuel economy mode is illustrated in FIG. 3 by cross-hatching.

The controller 67 can be programmed to perform the selection of and operation in an operating mode that results in NOX levels below the predetermined NOX level and involving the least fuel consumption after occurrence of a triggering event. The triggering event might be, for example, the passage of a predetermined amount of time, say, five, ten, fifteen, or thirty minutes. The triggering event may be some other event, for example, sensors may continuously monitor various conditions and the controller 67 may be programmed to automatically select an appropriate operating mode and operate in that mode upon detection of a particular condition of set of conditions. For example, a condition or set of conditions that might trigger performance of the selection of and operation in a particular operating mode may result from a vehicle slowing down as the result of turning off from a highway onto more congested urban streets, which can cause changes in, e.g., engine load, engine speed, and exhaust gas temperature.

The controller 67 can be programmed to at least periodically update its maps of fuel economy versus NOX levels exiting the EATS 25 for each operating mode. The controller 67 may be programmed to continuously update the maps of fuel economy versus NOX levels exiting the EATS 25 for each operating mode. In either event, by periodically or continuously updating the maps of fuel economy versus NOX levels exiting the EATS 25 for each operating mode, the engine arrangement 21 is able to adjust operation for changes such as aging EATS components. For example, as the DOC 55, DPF 59, SCR 61, and lean NOX trap 65 age, their respective impact on NOX levels changes. The period or continuous updating of the maps can also assist in ensuring selection of an optimal operating mode in the event of damage to or aging of other components of the engine arrangement that might have an effect on fuel consumption and/or NOX levels.

A method of operating a diesel engine arrangement is described in connection with the diesel engine arrangement 21 having a diesel engine 23 and an EATS 25 shown in FIG. 1. The EATS 25 includes one or more apparatus, e.g., DOC 55, DPF 59, SCR 61, and lean NOX trap 65, for controlling exhaust NOX levels. The engine 23 comprises a plurality of systems and components, at least some of which are adapted to be set to one or more control setpoints for one or more base actuators of the engine. The method comprises establishing a plurality of engine operating modes, each operating mode differing from any other operating mode with respect to at least one control setpoint. Three examples of operating modes are the fuel economy mode, the low heat mode, and the high heat mode illustrated in FIG. 3.

For each operating mode, fuel economy versus NOX levels exiting the EATS 25 is mapped as in FIG. 3. The step of mapping fuel economy versus system out NOX can comprise determining exhaust mass flow through the EATS 25, NOX level exiting the EATS, and temperature in the EATS, including the recording of engine speeds and loads to make the determinations. Temperature in the EATS 25 can comprise temperature of the SCR 61, which is typically one of the larger contributors to removal of NOX from the exhaust stream. Higher temperatures in the SCR 61 will typically result in removal of greater amounts of NOX and will tend to result from greater fuel consumption. Exhaust mass (or volume) flow through the EATS 25 will also typically be related to NOX levels as greater mass and volume flow, typically at higher loads and speeds and involving greater fuel consumption, will typically result in reduced residency time in the EATS and, consequently, less removal of NOX per unit mass or volume. NOX reduction in the SCR ordinarily increases as temperature goes up and ordinarily increases when exhaust flow is low. The greater the NOX reduction in the SCR, the higher the engine out NOX that can be permitted. Higher engine out NOX typically corresponds to better fuel economy.

An operating mode from among the plurality of operating modes is selected so that exhaust exiting the EATS contains NOX at no more than a predetermined NOX level and a least amount of fuel is consumed per unit energy. The engine 23 is then operated in the selected operating mode.

For each of the operating modes in question, the engine 23 is adapted to interpolate between a high NOX mode and a low NOX mode by adjusting one or more engine operating parameters. In the method, the engine interpolates along at least part of the range between the high NOX mode and the low NOX mode in the selected operating mode by adjusting one or more engine operating parameters. It is assumed for purposes of discussion that interpolation between high NOX and low NOX modes for the three operating modes in question occurs along a straight line, however, this is not necessarily the case. The engine operating parameters may involve the adjustment of one or more base actuator setpoints or other operating parameter affecting engine load, engine speed, and/or engine exhaust gas temperature.

When adjusting the one or more operating engine parameters so that the engine interpolates toward the high NOX mode in the selected operating mode, the controller 67 can be programmed to control operation of the engine so that the engine is permitted to interpolate to no higher than a point at which exhaust NOX levels are at or below the predetermined NOX level. In FIG. 3, a predetermined NOX level is set at 0.40 g/kWh, illustrated by a dashed vertical line. For example, it may generally be more fuel efficient to operate in fuel economy mode, versus operation in low heat mode or high heat mode, as long as NOX levels exiting the EATS 25 are sufficiently low and before NOX levels are at the predetermined NOX level. However, as seen in FIG. 2, when NOX levels during operation in fuel economy mode approach the predetermined NOX level, operation a different engine operating mode, i.e., low heat mode, from among the plurality of operating modes becomes more fuel efficient than operation in the fuel economy mode, and the controller 67 changes the selection of operating mode to low heat mode so that exhaust exiting the EATS contains NOX at no more than the predetermined NOX level and the least amount of fuel is consumed per unit energy. The engine 23 will then be operated in low heat mode until the engine interpolates along the low heat mode curve downward toward the low NOX mode of low heat mode to the point at which it again becomes more fuel efficient to operate in fuel economy mode.

FIG. 3 illustrates three different operating modes that have, for purposes of illustration of the method, the values in Table 1 below:

TABLE 1

| Operating Mode | NOX Mode (High or Low) | Fuel Consumption (g/kWh) | System Out NOX (g/kWh) |
|---|---|---|---|
| Fuel Economy | High | 192.0 | 0.60 |
| Fuel Economy | Low | 200.0 | 0.30 |
| Low Heat | High | 195.0 | 0.44 |
| Low Heat | Low | 205.0 | 0.25 |
| High Heat | High | 215.0 | 0.15 |
| High Heat | Low | 235.0 | 0.12 |

FIG. 3 shows a target, or predetermined maximum NOX level out of the EATS 25 that is set at 0.40 g/kWh, which might correspond to a legal limit for NOX, or a legal limit plus a safety factor. Assuming a straight line interpolation between High NOX mode and Low NOX mode for each operating mode, at the predetermined maximum NOX level, Table 2 below shows fuel consumption at the maximum NOX level permitted (0.40 g/kWh) for fuel economy mode and low heat mode and at the maximum NOX level (0.15 g/kWh) capable of being output during operation in high heat mode:

TABLE 2

| Operating Mode | System Out NOX (g/kWh) | Fuel Consumption (g/kWh) |
|---|---|---|
| Fuel Economy | 0.40 | 197.4 |
| Low Heat | 0.40 | 197.0 |
| High Heat | 0.15 | 215.0 |

It will be seen that, in this example, when the system out NOX from the EATS 25 is at the target, 0.40 g/kWh, fuel consumption via operation in low heat mode is lower than fuel consumption via operation in fuel economy mode. Accordingly, in this example, the controller 67 will ordinarily select operation in low heat mode instead of operation in fuel economy mode when system output NOX levels are close to the target value. The controller 67 will not ordinarily select operation in high heat mode except when an operator or other aspect of a program specifically requests operation in that mode, such as in order to perform an active regeneration of the DPF 59. Of course, characteristics of operating modes for various engines to which aspects of the present invention is applicable can be substantially different from the example provided in Tables 1 and 2.

The steps of selecting an operating mode and operating the engine 23 in the selected operating mode can be repeated after occurrence of a triggering event. The triggering event might be, for example, the passage of a predetermined amount of time, say, five, ten, fifteen, or thirty minutes. The triggering event may be some other event, for example, sensors may continuously monitor various conditions and the controller 67 may be programmed to automatically select an appropriate operating mode and operate in that mode upon detection of a particular condition of set of conditions. For example, a condition or set of conditions that might trigger performance of the selection of and operation in a particular operating mode may result from a vehicle slowing down as the result of turning off from a highway onto more congested urban streets, which can cause changes in, e.g., engine load, engine speed, and exhaust gas temperature.

The maps of fuel economy versus NOX levels exiting the EATS 25 for each operating mode will ordinarily be periodically or continuously updated. For example, as components of the EATS 25 age, the maps of fuel consumption versus NOX levels can generally be expected to move to the right of the graph shown in FIG. 3. By periodically or continuously updating the maps, the determination whether it is preferable to operate in one operating mode or another might change over time.

A method of operating a diesel engine arrangement 21 having a diesel engine 23 and an EATS 25 including one or more apparatus for controlling exhaust NOX levels might also be described as involving operating the engine in a first mode with a first series of control setpoints for a plurality of base actuators of the engine, and operating the engine in a second mode with a second series of control setpoints for the plurality of base actuators, at least one control setpoint of the first and second series of control setpoints being different. The method involves tracking exhaust mass or volume flow through the EATS 25, NOX levels exiting the EATS, and temperature in the EATS for the engine 23 over a plurality of engine speeds and loads in the first mode and in the second mode. One of the first mode and the second mode will then be selected so that, for a given engine speed and load, exhaust exiting the EATS contains NOX at no more than a predetermined NOX level and a least amount of fuel is consumed per unit energy. For each of the first and second operating modes, the engine 23 is adapted to interpolate between a high NOX mode and a low NOX mode by adjusting one or more engine operating parameters, and the method comprises interpolating along at least part of the range between the high NOX mode and the low NOX mode in the selected operating mode by adjusting one or more engine operating parameters. The method can comprise adjusting one or more operating engine parameters so that the engine interpolates toward the high NOX mode while operating in the selected operating mode, and, when or before NOX levels are at the predetermined NOX level, selecting another engine operating mode so that exhaust exiting the EATS contains NOX at no more than the predetermined NOX level.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method of operating a diesel engine having an exhaust aftertreatment system (EATS) including one or more apparatus for controlling exhaust NOX levels, the engine comprising a plurality of systems and components, at least some of which systems and components being adapted to be set to one or more control setpoints for one or more base actuators of the engine, the method comprising:
    establishing a plurality of engine operating modes, each operating mode differing from any other operating mode with respect to at least one control setpoint;
    for each operating mode, mapping fuel economy versus NOX levels exiting the EATS;
    selecting an operating mode from among the plurality of operating modes so that exhaust exiting the EATS contains NOX at no more than a predetermined NOX level and a least amount of fuel is consumed per unit energy;
    operating the engine in the selected operating mode until fuel economy in another operating mode at which exhaust exiting the EATS contains NOX at no more than a predetermined NOX level becomes superior to fuel economy in the selected operating mode; and
    selecting the another operating mode after fuel economy in the another operating mode at which exhaust exiting the EATS contains NOX at no more than a predetermined NOX level becomes superior to fuel economy in the selected operating mode,
    wherein the step of mapping fuel economy versus NOX levels comprises establishing a record, for each operating mode, of time spent at different engine speeds and loads and fuel economy and NOX levels at the recorded engine speeds and loads.

2. The method as set forth in claim 1, wherein the step of mapping fuel economy versus NOX levels comprises updating a record, for each operating mode, of time spent at different engine speeds and loads.

3. The method as set forth in claim 2, wherein the step of mapping fuel economy versus NOX levels comprises updating the record, for each operating mode, of fuel economy and NOX levels at the different engine speeds and loads.

4. The method as set forth in claim 1, wherein, for each operating mode, the engine is adapted to interpolate between a high NOX mode and a low NOX mode by adjusting one or more engine operating parameters, the method comprising interpolating along at least part of the range between the high NOX mode and the low NOX mode in the selected operating mode by adjusting one or more engine operating parameters.

5. The method as set forth in claim 4, comprising adjusting one or more operating engine parameters so that the engine interpolates toward the high NOX mode in the selected operating mode to no higher than a point at which exhaust NOX levels are at or below the predetermined NOX level.

6. The method as set forth in claim 4, comprising adjusting one or more operating engine parameters so that the engine interpolates toward the high NOX mode while operating in the selected operating mode, and, when at or before NOX levels are at the predetermined NOX level, selecting a different engine operating mode from among the plurality of operating modes so that exhaust exiting the EATS contains NOX at no more than the predetermined NOX level and the least amount of fuel is consumed per unit energy.

7. The method as set forth in claim 1, wherein the diesel engine comprises one or more of cylinder inlet valves, cylinder exhaust valves, fuel injection valves, fuel pumps, a compressor, a turbine, a turbocharger, an intake air throttle, a charge air cooler, and an exhaust gas recirculation line comprising an exhaust gas recirculation valve, the control setpoints comprising one or more of cylinder inlet valve opening timing, cylinder exhaust valve opening timing, fuel injection valve opening timing, fuel pumps pressure, a compressor boost pressure, turbine backpressure, an intake air throttle position, combustion chamber temperature, and exhaust gas recirculation valve position.

8. The method as set forth in claim 1, wherein the step of mapping fuel economy versus system out NOX comprises determining exhaust mass or volume flow through the EATS, NOX level exiting the EATS, and temperature in the EATS.

9. The method as set forth in claim 8, wherein temperature in the EATS comprises temperature of a selective catalytic reduction (SCR) catalyst.

10. The method as set forth in claim 1, comprising repeating the selecting and operating steps after occurrence of a triggering event.

11. The method as set forth in claim 10, wherein the triggering event comprises the passage of a predetermined amount of time.

12. The method as set forth in claim 1, comprising at least periodically updating maps of fuel economy versus NOX levels exiting the EATS for each operating mode.

13. The method as set forth in claim 12, comprising continuously updating the maps of fuel economy versus NOX levels exiting the EATS for each operating mode.

14. A method of operating a diesel engine having an exhaust aftertreatment system (EATS) including one or more apparatus for controlling exhaust NOX levels, comprising:
    operating the engine in a first mode with a first series of control setpoints for a plurality of base actuators of the engine;
    operating the engine in a second mode with a second series of control setpoints for the plurality of base actuators, at least one control setpoint of the first and second series of control setpoints being different;
    tracking exhaust mass or volume flow through the EATS, NOX levels exiting the EATS, and temperature in the EATS for the engine over a plurality of engine speeds and loads in the first mode and in the second mode;
    selecting one of the first mode and the second mode so that, for a given engine speed and load, exhaust exiting the EATS contains NOX at no more than a predetermined NOX level and a least amount of fuel is consumed per unit energy until fuel economy in the other one of the first mode and the second mode becomes superior to fuel economy in the selected one of the first and second mode and exhaust exiting the EATS contains NOX at no more than the predetermined NOX level; and
    selecting the other one of the first and second mode after fuel economy in the other one of the first mode and the second mode becomes superior to fuel economy in the selected one of the first and second mode and exhaust exiting the EATS contains NOX at no more than the predetermined NOX level.

15. The method as set forth in claim 14, wherein, for each of the first and second operating modes, the engine is adapted to interpolate between a high NOX mode and a low NOX mode by adjusting one or more engine operating parameters, the method comprising interpolating along at least part of the range between the high NOX mode and the low NOX mode in the selected operating mode by adjusting one or more engine operating parameters.

16. The method as set forth in claim 15, comprising adjusting one or more operating engine parameters so that the engine interpolates toward the high NOX mode while operating in the selected operating mode, and, when or before NOX levels are at the predetermined NOX level, selecting another engine operating mode so that exhaust exiting the EATS contains NOX at no more than the predetermined NOX level.

17. A diesel engine arrangement, comprising:
a diesel engine having an exhaust aftertreatment system (EATS);
a NOX sensor arranged to sense NOX levels exiting the EATS; and
a controller arranged to receive a signal from the NOX sensor, the controller comprising a map of fuel economy versus NOX levels exiting the EATS for a plurality of engine operating modes, each engine operating mode differing from any other engine operating mode with respect to at least one base actuator of the engine, the controller being programmed to select one of the plurality of operating modes and cause the engine to operate in the selected operating mode so that, for a given engine speed and load, exhaust exiting the EATS contains NOX at no more than a predetermined NOX level and a least amount of fuel is consumed per unit energy until fuel economy in another operating mode at which exhaust exiting the EATS contains NOX at no more than a redetermined NOX level becomes superior to fuel economy in the selected operating mode; and to select the another operating mode after fuel economy in the another operating mode at which exhaust exiting the EATS contains NOX at no more than a predetermined NOX level becomes superior to fuel economy in the selected operating mode,
wherein, for each operating mode, the engine is adapted to interpolate between a high NOX mode and a low NOX mode by adjusting one or more engine operating parameters, the controller being programmed so that the engine is permitted to interpolate toward the high NOX mode in the selected operating mode to no higher than a point at which exhaust NOX levels are at or below the predetermined NOX level.

18. The diesel engine arrangement as set forth in claim 17, wherein the diesel engine comprises one or more of cylinder inlet valves, cylinder exhaust valves, fuel injection valves, fuel pumps, a compressor, a turbine, a turbocharger, an intake air throttle, a charge air cooler, and an exhaust gas recirculation line comprising an exhaust gas recirculation valve, the control setpoints comprising one or more of cylinder inlet valve opening timing, cylinder exhaust valve opening timing, fuel injection valve opening timing, fuel pumps pressure, a compressor boost pressure, turbine backpressure, an intake air throttle position, combustion chamber temperature, and exhaust gas recirculation valve position.

19. The diesel engine arrangement as set forth in claim 17, wherein the controller is programmed so that, when one or more operating engine parameters are adjusted so that the engine interpolates toward the high NOX mode while operating in the selected operating mode, when or before NOX levels are at the predetermined NOX level, a different engine operating mode is selected from among the plurality of operating modes so that exhaust exiting the EATS contains NOX at no more than the predetermined NOX level and the least amount of fuel is consumed per unit energy.

20. The diesel engine arrangement as set forth in claim 17, wherein the controller is programmed to perform the selection of and operation in an operating mode after occurrence of a triggering event.

21. The diesel engine arrangement as set forth in claim 20, wherein the triggering event comprises the passage of a predetermined amount of time.

22. The diesel engine arrangement as set forth in claim 17, wherein the controller is programmed to at least periodically update maps of fuel economy versus NOX levels exiting the EATS for each operating mode.

23. The diesel engine arrangement as set forth in claim 22, wherein the controller is programmed to continuously update the maps of fuel economy versus NOX levels exiting the EATS for each operating mode.

* * * * *